(12) United States Patent
Joung et al.

(10) Patent No.: US 9,191,181 B2
(45) Date of Patent: Nov. 17, 2015

(54) DEVICE AND METHOD FOR TRANSMITTING TDD DOWNLINK DATA IN AN LTE SYSTEM

(75) Inventors: Jinsoup Joung, Seongnam-si (KR); Seunghwan Ji, Seongnam-si (KR); Ohkeol Kwon, Seongnam-si (KR); Yonghee Kim, Suwon-si (KR)

(73) Assignee: INNOWIRELESS CO., LTD. (KR)

( * ) Notice: Subject to any disclaimer, the term of this patent is extended or adjusted under 35 U.S.C. 154(b) by 89 days.

(21) Appl. No.: 14/355,933

(22) PCT Filed: Feb. 24, 2012

(86) PCT No.: PCT/KR2012/001420
§ 371 (c)(1),
(2), (4) Date: May 2, 2014

(87) PCT Pub. No.: WO2013/065911
PCT Pub. Date: May 10, 2013

(65) Prior Publication Data
US 2014/0269458 A1    Sep. 18, 2014

(30) Foreign Application Priority Data
Nov. 2, 2011 (KR) .......... 10-2011-0113468

(51) Int. Cl.
| | | |
|---|---|---|
| *H04J 3/00* | (2006.01) | |
| *H04L 5/14* | (2006.01) | |
| *H04L 1/18* | (2006.01) | |
| *H04L 12/64* | (2006.01) | |
| *H04W 72/12* | (2009.01) | |

(52) U.S. Cl.
CPC ............ *H04L 5/1469* (2013.01); *H04L 1/1874* (2013.01); *H04L 12/6418* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 7,839,894 B2* | 11/2010 | Yi | .................. | H04B 7/2603 370/474 |
| 8,254,295 B2 | 8/2012 | Choi et al. | | |
| 2003/0174730 A1* | 9/2003 | Hsueh | .................. | H04W 28/14 370/469 |
| 2011/0211503 A1 | 9/2011 | Che et al. | | |

FOREIGN PATENT DOCUMENTS

| | | |
|---|---|---|
| KR | 1020020028096 | 4/2002 |
| WO | 0241520 | 5/2002 |
| WO | 2008127015 | 10/2008 |

OTHER PUBLICATIONS

International Search Report—PCT/KR2012/001420 dated Oct. 30, 2012.

* cited by examiner

*Primary Examiner* — Edan Orgad
*Assistant Examiner* — Rebecca Song
(74) *Attorney, Agent, or Firm* — Cantor Colburn LLP

(57) ABSTRACT

A device for transmitting TDD downlink data in an LTE system includes: a data buffer sequentially loading IP data irregularly delivered from a layer 3 processing unit; a transmission control unit providing instructions for the creation of an ordinary downlink sub-frame PDU queue and a special sub-frame PDU queue at a ratio appropriate to UL/DL configuration information and sequentially delivering the data loaded in the ordinary downlink sub-frame PDU queue and the special sub-frame PDU queue to a layer 1 processing unit in the order prescribed in UL/DL configuration and in the loaded order; and an ordinary downlink sub-frame PDU queue creating unit and a special sub-frame PDU queue creating unit which create the ordinary downlink sub-frame PDU queue and the special sub-frame PDU queue according to the instructions of the transmission control unit and load the data loaded in the data buffer.

2 Claims, 4 Drawing Sheets

| Uplink-downlink configuration | Subframe number I | | | | | | | | | | (A) Throughput Rate | (B) Throughput Rate |
|---|---|---|---|---|---|---|---|---|---|---|---|---|
| | 0 | 1 | 2 | 3 | 4 | 5 | 6 | 7 | 8 | 9 | | |
| 0 | D | S | U | U | U | D | S | U | U | U | 57% | 85% |
| 1 | D | S | U | U | D | D | S | U | U | D | 73% | 82% |
| 2 | D | S | U | D | D | D | S | U | D | D | 80% | 80% |
| 3 | D | S | U | U | U | D | D | D | D | D | 89% | 78% |
| 4 | D | S | U | U | D | D | D | D | D | D | 90% | 77% |
| 5 | D | S | U | D | D | D | D | D | D | D | 91% | 77% |
| 6 | D | S | U | U | U | D | S | U | U | D | 67% | 83% |

DEVICE AND METHOD FOR TRANSMITTING TDD DOWNLINK DATA IN AN LTE SYSTEM

TECHNICAL FIELD

The present invention relates to a device and a method for transmitting time division duplexing (TDD) downlink data in a long term evolution (LTE) system, more particularly, to a device and a method for transmitting TDD downlink data in an LTE system which enables a TDD downlink signal to be transmitted every 1 ms in a layer 2 while satisfying throughput.

BACKGROUND ART

As well known, the name long term evolution (LTE) is so-named in the meaning of technology which enhanced the third generation mobile communication in the long term; at the present time it is considered as one of the strong candidates including WiBro Evolution for the fourth generation mobile communication technology.

The LTE is based on the standard 'Release 8' finalized in December 2008 by the 3rd Generation Partnership Project (3GPP) which is a standards organization for $3^{rd}$ generation mobile wireless communication; the channel bandwidths are from 1.25 to 20 MHz, the maximum transmission speed of a downlink is 100 Mbps for 20 MHz bandwidth, and the maximum transmission speed of an uplink is 50 MHz.

Wireless multiple access and duplexing methods are based on orthogonal frequency division multiplexing (OFDM), and high speed packet data transmission method is based on multiple-input and multiple-output (MIMO). LTE Advanced is an evolved version of an LTE, hereinafter all of these will be referred to as '3GPP LTE.'

Meanwhile, two types of techniques are provided for separating an uplink from a downlink in an LTE system. The first one is frequency division duplexing (FDD) technique which separates an uplink from a downlink with frequency bands, The second one is time division duplexing (TDD) technique which separates an uplink from a downlink with a time domain.

FIG. 1 is a table defining the lengths of transmission intervals of an uplink and a downlink in a frame structure of a TDD based LTE system. The lengths of transmission intervals of the uplink and the down link in time domain for TDD based LTE system are determined by the signal called 'UL/DL configuration' as illustrated in FIG. 1, according to the values thereof the uplink and the down link are classified into total of 7 types. In FIG. 1, "D" represents a downlink sub-frame, "U" represents an uplink sub-frame, "S" represents a special sub-frame where both downlink data and uplink data are transmitted simultaneously; length of one frame is 10 ms and length of each sub-frame is 1 ms, so there are total 10 sub-frames in a frame. In FIG. 1, for example, in configuration 1, switching from downlink to uplink occurs with 5 ms period, thus in each frame there are 4 downlink sub-frames, 4 uplink sub-frames, and 2 special sub-frames respectively.

FIG. 2 is a typical block diagram of a signal analyzer for an LTE system. As illustrated in FIG. 2, a typical signal analyzer for an LTE system, that is LTE test equipment, is provided with a layer 3 processing unit 100, a layer 2 processing unit 200, and a layer 1 processing unit 300. The layer 3 processing unit 100 is responsible for the processing of Internet Protocal (IP).

Layer 2 processing unit 200 comprises: a packet data convergence protocol (PDCP) which performs IP header compression and decompression, user data transmission, and maintenance of sequence number for radio bearers, and the like; a radio link control (RLC) which is responsible for the processing of hybrid automatic repeat request (HARQ) related to transmission error control; and a media access control (MAC) processing unit which is a sub-layer of data transmission protocol and a part of the data link layer. Finally, layer 1 processing unit 300 is responsible for the processing of physical layer (PHY).

Meanwhile, in a signal analyzer for an LTE system of the prior art, a layer 3 processing unit 100 is usually implemented in a general purpose operating system such as Windows or Linux which is being processed by the CPU; a layer processing unit 200 is implemented with an exclusive firmware which is being processed by the digital signal processor (DSP); and a layer 1 processing unit 300 is implemented with a firmware processed by the DSP or the field programmable gate array (FPGA). However, while the layer 2 processing unit 200 and the layer 1 processing unit 300 can sufficiently handle an event for 1 ms which is corresponding to one sub-frame, the layer 3 processing unit 100 cannot handle an event for 1 ms since it is implemented in a non-real time OS such as Windows or Linux. For this reason, in the layer 2 processing unit 200, the IP data received from the layer 3 processing unit 100 is being buffered and processed every 1 ms for transmitting to the layer 1 processing unit 300. However, according to a TDD downlink data processing technique as described above, the transport block size of the downlink data in the special sub-frame is only maximum 75% of the transport block size of a regular downlink sub-frame, in other words, since there is a difference in the transport block size of the downlink data between the special sub-frame and the downlink sub-frame, data loss problem occurs when the buffered data is transmitted every 1 ms.

To solve this problem, a method is adopted in the prior art, wherein data is being transmitted without allocating downlink data to the special sub-frame (method A), or data is being transmitted after reducing the transport block size of all the downlink sub-frames to the transport block size of the special sub-frame (method B).

However, in case when the above described method A and method B are adopted, there is an efficiency degradation problem owing to lower throughput rate for each UL/DL configuration as shown in the right side of FIG. 1 when compared with a case where data is being transmitted with maximum transport block size of the downlink sub-frame and the special sub-frame

SUMMARY OF INVENTION

Technical Problem

An objective of the present invention, devised to solve above described problems, is to provide a device and a method for transmitting TDD downlink data in an LTE system which enables a TDD downlink signal to be transmitted every 1 ms in a layer 2 while satisfying throughput.

Solution to Problem

In order to achieve the above described objective, according to one characteristic of the present invention, a device for transmitting TDD downlink data in an LTE system is provided which includes: a data buffer sequentially loading IP data irregularly delivered from a layer 3 processing unit; a transmission control unit providing instructions for the creation of an ordinary downlink sub-frame PDU queue and a special sub-frame PDU queue at a ratio appropriate to UL/DL configuration information and sequentially delivering the data loaded in said ordinary downlink sub-frame PDU queue and said special sub-frame PDU queue to a layer 1 processing unit in the order prescribed in UL/DL configuration and in the loaded order; and an ordinary downlink sub-frame PDU queue creating unit and a special sub-frame PDU queue creating unit which create the ordinary downlink sub-frame PDU queue and the special sub-frame PDU queue according to the instructions of said transmission control unit and load the data loaded in said data buffer, wherein the size of one transport block of said special sub-frame PDU queue is defined as a value smaller than that of one transport block of said ordinary downlink sub-frame PDU queue.

In the above described first characteristic, it is preferred to further comprise an ordinary re-transmitting downlink sub-frame PDU queue creating unit and a special re-transmitting sub-frame PDU queue creating unit in order to satisfy HARQ protocol. Meanwhile, it is characterized in that said UL/DL configuration information is obtained from said layer 1 processing unit.

According to another characteristic of the present invention, a method for transmitting TDD downlink data in an LTE system is provided which includes the steps of: (a) sequentially loading IP data which is processed in the layer 2 of the LTE system and irregularly delivered from the layer 3 processing unit; (b) classifying and sequentially loading IP data which is loaded in said data buffer after creating an ordinary downlink sub-frame PDU queue and a special sub-frame PDU queue according to the UL/DL configuration information; and (c) transmitting the data loaded in said ordinary downlink sub-frame PDU queue and said special sub-frame PDU queue to a layer 1 processing unit in accordance with an order corresponding to said UL/DL configuration information and a loading sequence, wherein the size of one transport block of said special sub-frame PDU queue is defined as a value smaller than that of one transport block of said ordinary downlink sub-frame PDU queue.

In the above described second characteristic, it is characterized in that and further comprising the steps of: (b') classifying and sequentially loading IP data which is loaded in said data buffer after further creating an ordinary downlink sub-frame PDU queue and a special sub-frame PDU queue for re-transmitting; and (d) re-transmitting the downlink sub-frame data or the special sub-frame data where the transmission error occurred after reading from said re-transmitting downlink sub-frame PDU queue or said special re-transmitting sub-frame PDU queue when a transmission error occurs.

Meanwhile, it is characterized in that said UL/DL configuration information and said transmission error information is obtained from said layer 1 processing unit.

Advantageous Effects of Invention

According to a device and a method for transmitting TDD downlink data in an LTE system of the present invention, maximum throughput can be obtained in transmitting downlink data without developing a new firmware for TDD. Furthermore, existing HARQ can be handled efficiently by adopting a dual buffering technique.

DESCRIPTION OF SYMBOLS

Figures 1, 2:
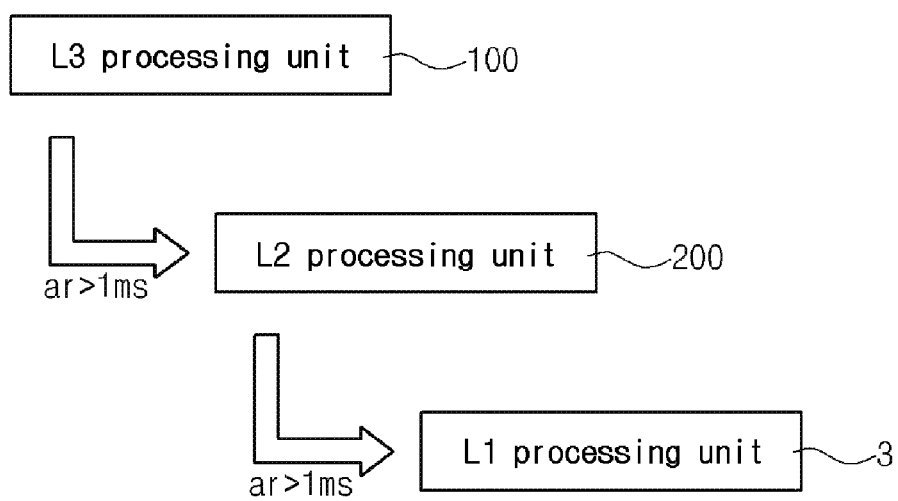
FIG. 1 is a table defining the length of an uplink and a downlink transmission interval in the frame configuration based on TDD in an LTE system
FIG. 2 is a general block diagram of a signal analyzer for an LTE system.

100: layer 3 processing unit
200: layer 2 processing unit,
210: transmission control unit
220: PDCP data buffer
230: first PDU queue creating unit
232: N/S PDU queue creating unit
234: S/S PDU queue creating unit
240: re-transmission PDU queue creating unit
242: N/S Ret PDU queue creating unit
244: S/S Ret PDU queue creating unit
300: layer 1 processing unit

DETAILED DESCRIPTION OF EMBODIMENT

Hereinafter, a device and a method for transmitting TDD downlink data in an LTE system of the present invention will be described more in detail with reference to the accompanying drawings.

Figure 3:
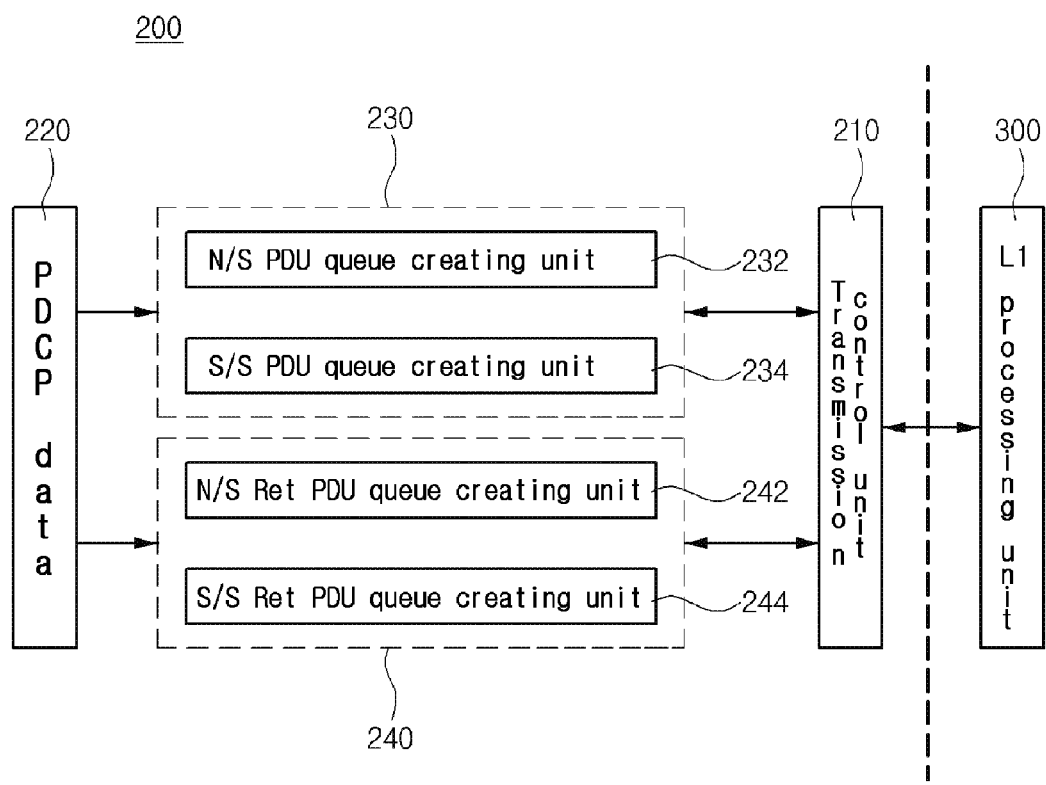
FIG. 3 is a block diagram of a device for transmitting TDD downlink data in an LTE system of the present invention.

FIG. 3 is a block diagram of a device for transmitting TDD downlink data in an LTE system of the present invention, and comprises a layer 2 processing unit. As illustrated in FIG. 2, a device for transmitting TDD downlink data in an LTE system of the present invention mainly comprises: a PDCP data buffer 220 sequentially loading IP data irregularly delivered from a layer 3 processing unit 100; a transmission control unit 210 directing the creation of an ordinary downlink sub-frame protocol data unit (PDU) queue (hereinafter referred to as simply 'N/S PDU queue') and a special sub-frame PDU queue (hereinafter referred to as simply 'S/S PDU queue') at a ratio appropriate to the UL/DL configuration information and sequentially delivering the data loaded in the N/S PDU queue and the S/S PDU queue to the layer 1 processing unit 300 in the order prescribed in the UL/DL configuration and in the loaded order (FIFO); and a N/S PDU queue creating unit 232 and a S/S PDU queue creating unit 234 which create a N/S PDU queue and a S/S PDU queue according to the instructions of said transmission control unit 210. An N/S PDU queue creating unit 232 and a S/S PDU queue creating unit A are combined to configure a first transmission PDU queue creating unit 230.

Meanwhile, according to a device for transmitting TDD downlink data in an LTE system of the present invention, an N/S Ret PDU queue creating unit 242 and a S/S Ret PDU queue creating unit 244 may further be provided in order to satisfy HARQ protocol; the N/S Ret PDU queue creating unit 242 and the S/S Ret PDU queue creating unit 244 also create an N/S Ret PDU queue and a S/S Ret PDU queue according to the instruction of the transmission control unit 210. An N/S Ret PDU queue and a S/S Ret PDU queue may be comprised of the same structure as an N/S PDU queue and a S/S PDU queue. An N/S Ret PDU queue creating unit 242 and a S/S Ret PDU queue creating unit 244 are combined to configure a re-transmission PDU queue creating unit 240.

In the above describe configuration, the transmission control unit 210 can obtain UL/DL configuration information from the layer 1 processing unit 300.

Figure 4:
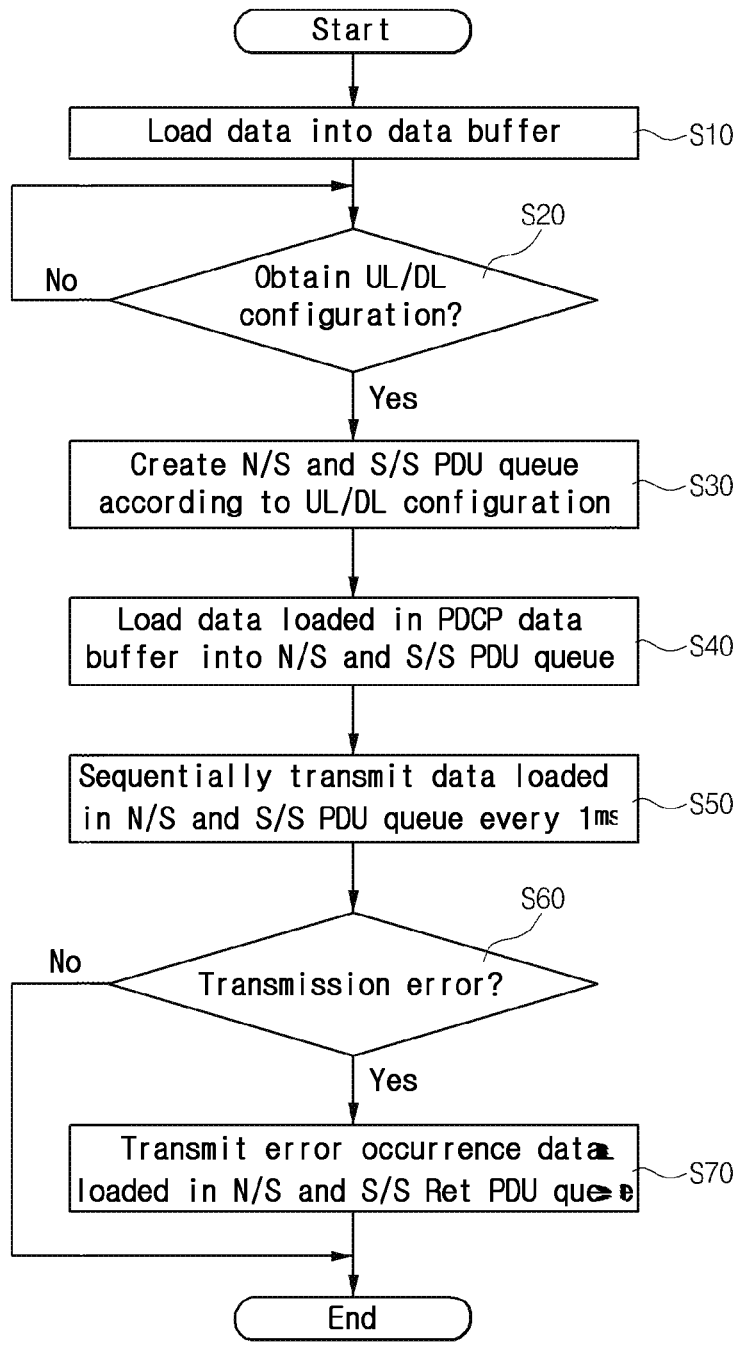
FIG. 4 is a flow diagram for explaining a method for transmitting TDD downlink data in an LTE system of the present invention.

FIG. 4 is a flow diagram for explaining a method for transmitting TDD downlink data in an LTE system of the present invention, and it should be clear that the method is performed by the transmission control unit 210 as a main agent.

As illustrated in FIG. 4, in step S10, the IP data received from the layer 3 processing unit 100 is sequentially loaded in the PDCP data buffer 220.

Next, in step S20, for example, it is determined whether UL/DL configuration information is received from the layer 1 processing unit 300; while step S20 is repeated if the information is not received, step S30 is proceeded when the information is received such that an N/S PDU queue and a S/S PDU queue are being created by sending instructions to the N/S PDU queue creating unit 232 and the S/S PDU queue creating unit 234 according to the received UL/DL configuration information. Of course in this step S30, an N/S Ret PDU queue and a S/S Ret PDU queue can be additionally created by sending instructions to the N/S PDU Ret queue creating unit 242 and the S/S Ret PDU queue creating unit 244

Here, if the present UL/DL configuration corresponds to No. 0 in FIG. 1, two each of N/S PDU queues and two each of S/S PDU queues will be created corresponding to transport blocks. In a similar way, if the UL/DL configuration corresponds to No. 1, four each of N/S PDU queues and two each of S/S PDU queues will be created respectively corresponding to transport blocks; for No. 2, six each of N/S PDU queues and two each of S/S PDU queues will be created respectively corresponding to transport blocks; for No. 3, six each of N/S PDU queues and one each of S/S PDU queues will be created respectively corresponding to transport blocks; for No. 4, seven each of N/S PDU queues and one each of S/S PDU queues will be created respectively corresponding to transport blocks; for No. 5, eight each of N/S PDU queues and one each of S/S PDU queue will be created respectively corresponding to transport blocks; and finally, for No. 6, three each of N/S PDU queues and two each of S/S PDU queues will be created corresponding to transport blocks In here, the size of one transport block of a S/S PDU queue will be maximum 75% of the size of one transport block of an N/S PDU queue.

Next, in step S40, the data loaded in the PDCP data buffer 220 is sequentially loaded in the N/S PDU queue and the S/S PDU queue which are created in the previous step S30.

Figure 5:
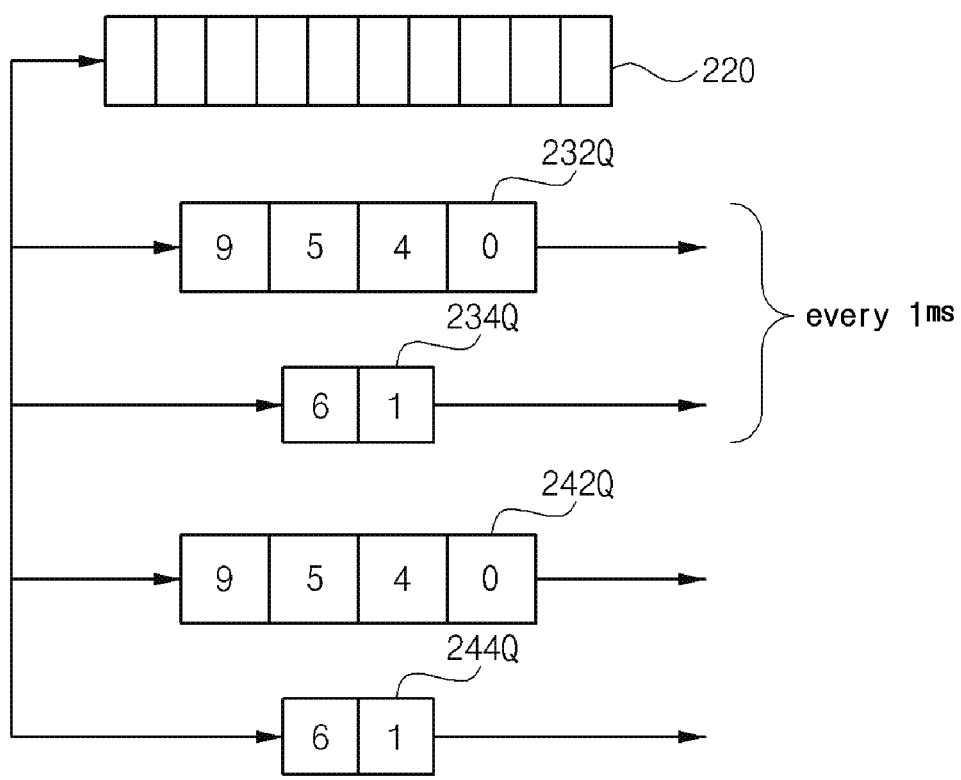
FIG. 5 is an exemplary drawing showing the principle of a method for transmitting TDD downlink data at a specific UL/DL configuration in an LTE system of the present invention.

FIG. 5 is an exemplary drawing showing the principle of a method for transmitting TDD downlink data at a specific UL/DL configuration in an LTE system of the present invention, wherein a transmission method corresponding to UL/DL configuration 1 is being described.

As illustrated in FIG. 5, if the corresponding UL/DL configuration is 1 in FIG. 1, the N/S PDU queue creating unit 232 and the S/S PDU queue creating unit 234 first creates a PDU queue for RLC according to the instruction of the transmission control unit 210; while the N/S PDU queue creating unit 232 creates queues corresponding to 4 downlink transport blocks, the S/S PDU queue creating unit 234 creates 2 special frame transport blocks, i.e. transport blocks having the size of maximum 75% of a downlink transport block.

And in the N/S PDU queue and the S/S PDU queue which are created in such a way, an IP data loaded in the PDCP data buffer 220 is sequentially loaded after it is processed by the RLC protocol. Thus, while downlink sub-frame data corresponding to 0, 4, 5, and 9 is sequentially loaded in the N/S PDU queue, downlink data corresponding to 1 and 6 is sequentially loaded in the S/S PDU queue.

In a similar way, the N/S PDU queue creating unit 232 and the S/S PDU queue creating unit 234 create PDU queues for MAC respectively according to the instruction of the transmission control unit 210; while the N/S PDU queue creating unit 232 creates queues corresponding to 4 downlink transport blocks, the S/S PDU queue creating unit 234 creates 2 special frame transport blocks. In addition, the N/S Ret PDU queue creating unit 242 and the S/S Ret PDU queue creating unit 244 also create an N/S Ret PDU queue corresponding to the downlink transport blocks and a S/S Ret PDU queue corresponding to the 2 special frame transport blocks according to the instruction of the transmission control unit 210.

Again back to FIG. 4, in step S50, the transmission control unit 210 transmits data, which is loaded in the N/S PDU queue and the S/S PDU queue, every 1 ms to layer 1 processing unit 300 in the order prescribed in the corresponding UL/DL configuration information and in the loaded order. Thus if the corresponding UL/DL configuration is 1, data loaded by downlink transport block size at the most right side of the N/S PDU queue is transmitted to the downlink sub-frame 0; next, data loaded at the right side of the S/S PDU queue is transmitted to the special sub-frame 1; next, data loaded at the second from the right side of the S/S PDU queue is transmitted to the downlink sub-frame 4; next, data loaded at the third from the right side of the N/S PDU queue is transmitted to the downlink sub-frame 5; next, data loaded at the left side of the S/S PDU queue is transmitted to the downlink sub-frame 6; and finally, data loaded at the most right side of the N/S PDU queue is transmitted to the downlink sub-frame 9.

Again back to FIG. 4, in step S60, the occurrence of the transmission errors is determined, and the information related to the occurrence of the transmission errors may be obtained from the layer 1 processing unit 300. According to the result of the decision in step S60, when a transmission error occurs the downlink sub-frame data or the special sub-frame data where the transmission error occurred is immediately re-transmitted after reading from the N/S Ret PDU queue or the S/S Ret PDU queue, When this re-transmission happens, the sub-frame data is not transmitted sequentially, however, since data is transmitted with a number assigned thereto at the time of transmission or re-transmission from the transmission end, data can be processed without any problem owing to such a number at the receiving end.

A device and a method for transmitting TDD downlink data in an LTE system of the present invention are not limited by the foregoing exemplary embodiments, and various modifications are possible within the scope and the technical spirit of the present invention.

What is claimed is:

1. A method for transmitting TDD downlink data in an LTE system including the steps of:
   (a) sequentially loading IP data in a data buffer which is processed in a layer 2 of the LTE system and irregularly delivered from a layer 3 processing unit;
   (b) classifying and sequentially loading IP data which is loaded in said data buffer after creating an ordinary downlink sub-frame PDU queue and a special sub-frame PDU queue at a ratio appropriate to a UL/DL configuration information;
   (b') classifying and sequentially loading IP data which is loaded in said data buffer after further creating an ordinary re-transmitting downlink sub-frame PDU queue and a special re-transmitting sub-frame PDU queue for re-transmitting in order to satisfy HARQ protocol;

(c) transmitting the data loaded in said ordinary downlink sub-frame PDU queue and said special sub-frame PDU queue to a layer 1 processing unit in accordance with an order corresponding to said UL/DL configuration information and a loading sequence, wherein the size of one transport block of said special sub-frame PDU queue is defined as a value smaller than that of one transport block of said ordinary downlink sub-frame PDU queue; and (d) reading from said re-transmitting downlink sub-frame PDU queue or said special re-transmitting sub-frame PDU queue when a transmission error occurs and re-transmitting the downlink sub-frame data or the special sub-frame data where the transmission error occurred.

2. The method for transmitting TDD downlink data in an LTE system in claim 1, wherein said UL/DL configuration information and information about said transmission error is obtained from said layer 1 processing unit.

* * * * *